Figure 1:
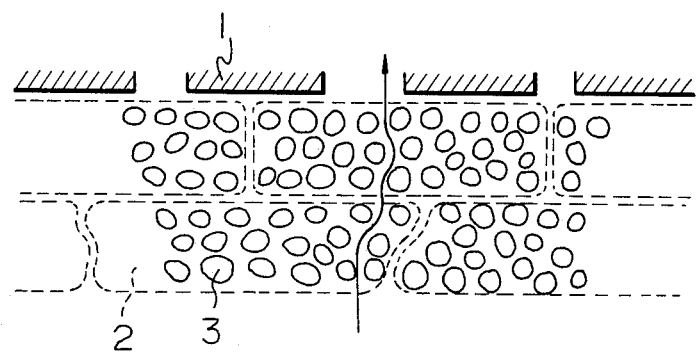

United States Patent [19]

Tomita et al.

[11] Patent Number: 4,761,231

[45] Date of Patent: Aug. 2, 1988

[54] TUBULAR FLUID FILTER

[75] Inventors: Yoji Tomita; Kenichi Mitsuhashi, both of Ibaraki, Japan

[73] Assignee: Kanebo Limited, Tokyo, Japan

[21] Appl. No.: 404,973

[22] Filed: Aug. 4, 1982

[30] Foreign Application Priority Data

Aug. 4, 1981 [JP] Japan .................................. 56-122763

[51] Int. Cl.[4] ............................................. B01D 29/14
[52] U.S. Cl. .................................................. 210/497.1
[58] Field of Search ............. 210/497.1, 497.01, 500.1, 210/508

[56] References Cited

U.S. PATENT DOCUMENTS

| | | | |
|---|---|---|---|
| 2,820,549 | 1/1958 | Belke | 210/497.1 X |
| 3,213,016 | 10/1965 | Gowers et al. | 210/497.01 X |
| 3,319,793 | 5/1967 | Miller, Jr. et al. | 210/497.1 X |
| 4,278,551 | 7/1981 | Hou et al. | 210/508 X |
| 4,318,774 | 3/1982 | Powell et al. | 210/508 X |

Primary Examiner—Frank Spear
Attorney, Agent, or Firm—Armstrong, Nikaido, Marmelstein & Kubovcik

[57] ABSTRACT

A tubular fluid filter comprising a winding of a textured multifilament yarn of a synthetic polymer having a take-up density of from 0.15 to 0.60 $cm^3/cm^3$ on a tubular bobbin having apertures for the passage of fluid provided over the peripheral surface thereof.

5 Claims, 1 Drawing Sheet

TUBULAR FLUID FILTER

The invention relates to a tubular fluid filter. More particularly, the invention relates to a fluid filter comprising a winding of yarn on a tubular bobbin having apertures for the passage of fluid over the peripheral surface thereof.

Tubular fluid filters hitherto known comprise a winding of a yarn, a roving, a mat, a sheet or the like of textile material onto a perforated or foraminous tubular bobbin made of metal or plastic material and having apertures allowing the free passage of fluid (see, for example, U.S. Pat. No. 3,065,856). Of the filters of this type, filters having a winding of a spun yarn of cotton fibers or polypropylene staple fibers have broadly been used industrially. In such filters, it is possible to vary the filtering characteristics in a wide range by appropriately selecting the fineness of the spun yarn, the degree of crimp of the individual component fibers of the spun yarn and the take-up conditions. It is also possible to impart to such filters a desirable heat resistance, chemical resistance, and the like depending on the type of fibers selected for use.

However, since the above-mentioned spun yarn is composed of short fibers having a small length, it is necessary to impart to the yarn a twist of about 100 to 300 T/M at the spinning stage so as to produce a high coherency in the yarn. Therefore, the resultant yarn has a high coherency and cohesiveness so that the yarn and the individual fibers are not easily frayed or loosened and, thus, the yarn is not easily extended in a direction perpendicular to the yarn axis. In the case where such a spun yarn is used for the production of tubular fluid filters, it is necessary, since the spun yarn has a high break-through resistance, that the yarn be wound onto a bobbin so as to form diamond-shaped apertures between the adjacent yarns, and filtration is effected by passing fluid through the diamond-shaped apertures and trapping particles by means of napped fibers or fluffs extending into the apertures. Thus, the resultant filters have a fairly poor particle-trapping efficiency and filtering accuracy. Therefore, attempts have been made, in order to improve the filtering accuracy of the filter, to make the volume of the apertures constant or smaller by controlling the take-up conditions in the production process. However, improvement of the filtering accuracy of the filter has been limited in that the uniformity of the resultant filters is not satisfactory. Further, broken fibers are often produced during actual use of the resultant filters, and these broken fibers adversely stain the filtering system.

Figure 2:
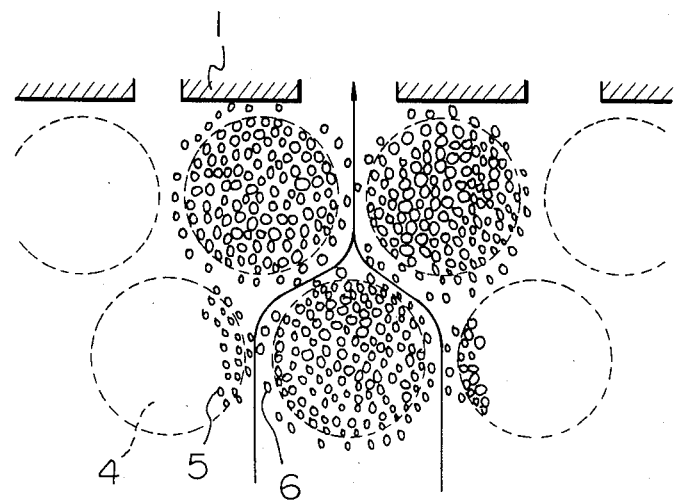

In the accompanying drawings,

FIG. 1 is a partial longitudinal cross-sectional view schematically illustrating a tubular fluid filter according to the present invention, and FIG. 2 is a partial longitudinal cross-sectional view schematically illustrating a conventional tubular fluid filter having a winding of spun yarn.

We have made extensive studies in an attempt to overcome the above-mentioned drawbacks of conventional tubular fluid filters, the present invention being the result of our studies.

It is the primary object of the present invention, therefore, to provide a tubular fluid filter having a high performance and filtering efficiency without causing adverse staining of the filtering system.

Thus, the present invention provides a tubular fluid filter comprising a winding of a textured multifilament yarn of a synthetic polymer having a take-up density of from 0.15 to 0.60 $cm^3/cm^3$ on a tubular bobbin having apertures for the passage of fluid provided over the peripheral surface thereof.

Examples of the textured multifilament yarn of a synthetic polymer usable for the present invention may include bulk-textured multifilament yarns, such as false-twisted yarns, stuffer, knit-deknit, or otherwise crimped yarns, air-jet textured yarns, and composite filament yarns of polyamides, polyesters, and polyolefins. These bulk textured yarns may be produced by known methods, such as false-twisting by means of a spindle or friction disk, air-jet texturing by means of an air-jet nozzle, and crimping by means of a stuffer box, card cloth, or gear or by a knit-deknit process.

The bulk-textured yarns are composed of continuous filaments and usually have no twist or a low twist up to 80 T/M so that the individual component filaments are easily loosened and, thus, the yarns are easily extended in the direction perpendicular to the yarn axis. It is preferable, in view of the practically desired filtering efficiency, that the bulk-textured yarns be composed of individual filaments of 10 to 30 deniers each having 350 to 800 crimps per meter and have a total denier of 500 to 4,000 deniers.

The bulk-textured yarns of synthetic polymer multifilaments may be wound onto a perforated or foraminous bobbin traversely or upon a perforated or foraminous flanged bobbin parallelly, for example, by a conventional center-drive type or surface-drive take-up machine provided with a traverse mechanism. The textured yarn wound onto the bobbin at a take-up density of 0.15 to 0.60 $cm^3/cm^3$ is extended and flattened in the direction perpendicular to the yarn axis to form a homogenous filamentary layer without producing vacant spaces between the adjacent yarns or filaments and the bulkiness due to the crimp of the individual filaments is maintained. In this case, the performance of the resultant filter mainly depends upon the take-up density but is not greatly affected by the angle of traverse, the take-up speed, or the like.

The present invention will further be described below with reference to the accompanying drawings.

In the drawings, 1 denotes a tubular bobbin wall having apertures for the passage of fluid, 2 denotes a bulk-textured yarn having synthetic polymer filaments, 3 denotes one of the individual synthetic polymer filaments, 4 denotes a spun yarn, 5 denotes one of the short fibers of which the spun yarn is composed, and 6 denotes one of the napped fibers or fluffs.

In the tubular fluid filter according to the present invention as shown in FIG. 1, fluid to be filtered passes through between adjacent individual filaments 3 composing multifilament yarn 2, as illustrated by the arrow, due to the absence of apertures or vacant spaces between adjacent parts of multifilament yarn 2, and, thus, the particles to be filtered off are trapped by the filamentary layer composed of filaments 3. On the contrary, in the conventional tubular fluid filter as illustrated in FIG. 2, fluid to be filtered passes through apertures or vacant spaces existing between adjacent spun yarns 4, as illustrated by the arrow, and the particles to be filtered off are trapped by the apertures or vacant spaces or by napped fibers or fluffs 6 existing therein.

In a conventional tubular fluid filter having a winding of spun yarn, the performance of the filter depends upon factors such as the angle of traverse and the like which affect the size, shape, arrangement, and uniformity of the apertures between the adjacent yarns. However, in the tubular fluid filter according to the present invention, the performance of the filter is little affected by these factors but is largely affected by the take-up density. The shape of the flattened yarn cross-section and the configuration of the crimps are varied by changing the take-up density so as to desirably control the performance of the resultant filter. If the take-up density is high, fine particles may be efficiently trapped while if the take-up density is low, large particles may be efficiently trapped. In this case, it is possible, in order to obtain a filter having the same performance as that of a conventional filter having a winding of spun yarn, to make the take-up density lower than that of the conventional filter, and, therefore, the resultant filter can advantageously have a low pressure loss during the passage of water and a long working time until void stoppage. Further, the filter according to the present invention can be produced so that it has a uniform quality.

Further, in the filter according to the present invention, if a bulk-textured yarn having synthetic polymer multifilaments having a modified cross-sectional shape is employed, desirable results can be obtained due to the high bulkiness and large surface area inherent in the modified cross-sectional filaments.

The tubular fluid filter should suitably have a take-up density of 0.15 to 0.60 $cm^3/cm^3$, preferably 0.20 to 0.50 $cm^3/cm^3$. If the take-up density is less than 0.15 $cm^3/cm^3$, sloughing off of the filament layer may occur during the actual use of the filter. On the other hand, if the take-up density is greater than 0.60 $cm^3/cm^3$, the filament layer may lose its bulkiness due to disappearance of the crimps.

The present invention is illustrated below by way of non-limitative examples. In the examples, the properties of the resultant filters were determined as follows:

1. Take-up Density: The true volume of the yarn wound onto a bobbin divided by the apparent volume of the yarn layer of the filter. The take-up density is calculated according to the following equation.

$$\frac{\text{Weight of yarn (g)}}{\text{Specific gravity of yarn (g/cm}^3\text{)}} \times \frac{1}{\text{Apparent volume of yarn layer (cm}^3\text{)}} = \text{Take-up density (cm}^3/cm^3\text{)}$$

2. Pressure Loss During Passage of Water: The pressure ($kg/cm^2$) necessary to attain a flow rate of water of 30 liters/min. when water is passed through a filter on a filter machine.

3. Void Stoppage: The weight (g) of class 8 dust as defined in Japan Industrial Standards (JIS) Z 8901 introduced into the filtering system until a pressure difference of 1 $kg/cm^2$ is attained when water is passed through a filter at a rate of 30 liters/min.

4. Filtering Accuracy: The size ($\mu m$) of the maximum particles contained in the filtrate when water containing class 8 dust (JIS Z 8901) is passed through a filter.

5. Filtering Efficiency: The percentage by weight of class 8 dust (JIS Z 8901) filtered off when water containing the dust is passed through a filter.

6. Variation in Filtering Accuracy: The variation in filtering accuracy in 5 samples was evaluated.

◉ : very small variation
○ : small variation
Δ: fairly remarkable variation
X: very remarkable variation

EXAMPLE 1

Polyethylene terephthalate yarns of 150 deniers/36 filaments and 150 deniers/72 filaments were subjected to texturing, including false twisting thereof, by using a three-shaft friction disk. The respective yarns were then doubled to obtain textured yarns having 300 deniers/72 filaments and 300 deniers/144 filaments. Each of the yarns was wound onto a foraminous plastic bobbin having an outer diameter of 32 mm and a length of 245 mm and having about 410 4×4 mm diamond-shaped apertures by means of a take-up machine having a center-drive system so as to form a tubular filter having an outer diameter of 60 mm. Several filters were prepared for each yarn with the take-up tension being varied.

The filter obtained using yarn composed of finer individual filaments (i.e., the yarn having 300 deniers/144 filaments) was suitable for filtering finer particles and had a higher pressure loss during the passage of water and a lower void stoppage than did the filter obtained using yarn composed of thicker individual filaments.

EXAMPLE 2

A nylon-6 yarn having 2600 deniers/128 filaments was textured by continuously heating the yarn with steam and blowing the yarn against a rotating drum having a card cloth on its surface. The yarn was wound onto a foraminous bobbin in the manner described in Example 1.

EXAMPLE 3

A nylon-6 yarn having 2600 deniers/128 filaments, each filament having a tri-lobar cross-section, was textured in the manner described in Example 2. The yarn was then wound onto a foraminous bobbin in the manner described in Example 1.

Alternatively, the textured yarn was subjected to twisting at a number of twists of 80 T/M and then was wound onto a foraminous bobbin in the manner described in Example 1.

It was difficult to obtain a filter having a high take-up density using the yarn having filaments having a tri-lobar cross-section since the yarn was highly bulky and had a large surface area. However, the obtained filters, having a low take-up density, had a filtering accuracy substantially equal to that of the filter obtained using a yarn having circular cross-sectional filaments and, in addition, had a low pressure loss during the passage of water and a low void stoppage.

The filters obtained using the textured and twisted yarn had a lower take-up density and were suitable for trapping large particles.

EXAMPLE 4

A polypropylene yarn having 2500 deniers/120 filaments, each filament having a tri-lobar cross-section, was textured as described in Example 2 and was wound onto a foraminous bobbin in the manner described in Example 1.

The obtained results were substantially equal to those in Example 3.

COMPARATIVE EXAMPLE

Polypropylene staple fibers of a fineness of 2 deniers and a length of 76 mm and polypropylene staple fibers of a fineness of 3 deniers and a length of 76 mm were blended at a weight ratio of 1:1 and then were spun in a conventional manner into a spun yarn having a count of 2.3. The yarn was then wound onto a foraminous bobbin in the manner described in Example 1.

In this case, a fair amount of broken fibers were produced from the initial stage of water passage and adversely stained the filtering system.

The descriptions and properties of the filters obtained in the above examples are shown in Table 1 below.

Further, the descriptions and properties of the filters obtained as mentioned in the above examples and having a filtering accuracy of 5 μm are also shown in Table 2.

In Table 1, the asterisked values were measured using class 7 dusts as defined in JIS Z 8901.

We claim:

1. A tubular fluid filter comprising a winding of a bulk-textured multifilament yarn of a synthetic polymer having a take-up density of from 0.20 to 0.50 cm³/cm³ on a tubular bobbin having apertures for the passage of fluid provided over the peripheral surface thereof, said bulk-textured filament yarn having no twist or a low twist up to 80 T/M.

2. A tubular fluid filter according to claim 1, wherein the synthetic polymer is selected from polyamides, polyesters, and polyolefins.

3. A tubular fluid filter according to claim 1, wherein the individual filaments have a modified cross-sectional shape.

4. A tubular fluid filter according to claim 1, wherein the textured multifilament yarn is composed of individual filaments of 10 to 30 deniers each having 350 to 800 crimps per meter and has a total denier of 500 to 4,000 deniers.

5. A tubular fluid filter according to claim 1, wherein the bulk-textured filament yarn is extended and flatened in the direction perpendicular to the yarn axis so as to form a homogenous filamentary layer.

* * * * *

TABLE 1

| | Material yarn | | | | Resultant filter | | | | |
|---|---|---|---|---|---|---|---|---|---|
| Example | Composition | Deniers/filaments (count) | Cross-sectional shape | Number of twists T/M | Take-up density cm³/cm³ | Pressure loss during water passage kg/cm² | Void stoppage g | Filtering accuracy m | Filtering efficiency % | Variation in filtering accuracy |
| 1 | Polyethylene terephthalate false-twisted yarn | 300/72 | Circular | 0-5 | 0.25 | 0.23 | 12 | 30 | 61 | △ |
| | | | | | 0.30 | 0.26 | 8 | 20 | 69 | ○ |
| | | | | | 0.34 | 0.40 | 6 | 5 | 83 | ○ |
| | | 300/144 | Circular | 0-5 | 0.28 | 0.28 | 7 | 20 | 52 | ○ |
| | | | | | 0.36 | 0.42 | 4 | 5 | 85 | ○ |
| | | | | | 0.45 | 0.78 | 1 | 1 | 93 | ○ |
| | | | | | 0.55 | >1.00 | 0.3 | 0.5 | 96 | △ |
| 2 | Nylon-6 textured yarn | 2600/128 | Circular | 0-5 | 0.21 | 0.13 | 25 | 50 | 70 | △ |
| | | | | | 0.35 | 0.30 | 7 | 10 | 80 | ○ |
| | | | | | 0.37 | 0.50 | 3 | 5 | 88 | ○ |
| 3 | Nylon-6 textured yarn | 2600/128 | Tri-lobar | 0-5 | 0.13 | Yarn layer on bobbin was collapsed. | | | | — |
| | | | | | 0.21 | 0.18 | 16 | 30 | 58 | ○ |
| | | | | | 0.29 | 0.22 | 12 | 20 | 73 | ◉ |
| | | | | | 0.32 | 0.28 | 9 | 10 | 77 | ◉ |
| | | | | | 0.34 | 0.32 | 8 | 5 | 82 | ◉ |
| | | | | | 0.42 | 0.50 | 4 | 1 | 93 | ◉ |
| | | 2600/128 | Tri-lobar | 80 | 0.16 | <0.10 | 50* | 120* | 30* | △ |
| | | | | | 0.27 | 0.15 | 32 | 60 | 40 | ○ |
| | | | | | 0.36 | 0.24 | 12 | 15 | 77 | ○ |
| 4 | Polypropylene textured yarn | 2500/120 | Tri-lobar | 0-5 | 0.25 | 0.18 | 17 | 30 | 62 | ○ |
| | | | | | 0.35 | 0.23 | 11 | 20 | 70 | ◉ |
| | | | | | 0.42 | 0.32 | 7 | 5 | 83 | ◉ |
| | | | | | 0.51 | 0.51 | 3 | 1 | 94 | ◉ |
| Comparative | Polypropylene spun yarn | 2.3 (count) | Circular | 100 | 0.25 | 0.15 | 24 | 60 | 40 | △ |
| | | | | | 0.29 | 0.17 | 20 | 50 | 53 | △ |
| | | | | | 0.32 | 0.31 | 8 | 30 | 60 | × |
| | | | | | 0.60 | 0.80 | 1 | 5 | 74 | × |
| | | | | | 0.71 | Bobbin was broken due to high tension. | | | | — |

TABLE 2

| | Material yarn | | | | Resultant filter | | | | |
|---|---|---|---|---|---|---|---|---|---|
| Example | Composition | Deniers/filaments (count) | Cross-sectional shape | Number of twists T/M | Take-up density cm³/cm³ | Pressure loss during water passage kg/cm² | Void stoppage g | Filtering efficiency % | Adverse staining of filtering system |
| 1 | Polyethylene terephthalate | 300/72 | Circular | 0-5 | 0.34 | 0.40 | 6 | 83 | Not appeared |
| | | 300/144 | Circular | 0-5 | 0.36 | 0.42 | 4 | 85 | " |
| 2 | Nylon-6 | 2600/128 | Circular | 0-5 | 0.37 | 0.50 | 3 | 88 | " |
| 3 | Nylon-6 | 2600/128 | Tri-lobar | 0-5 | 0.34 | 0.32 | 8 | 82 | " |
| 4 | Polypropylene | 2500/120 | Tri-lobar | 0-5 | 0.42 | 0.32 | 7 | 83 | " |
| Comparative | Polypropylene (spun) | 2.3 (count) | Circular | 100 | 0.60 | 0.80 | 1 | 74 | Appeared |